US010771257B1

(12) United States Patent
de Matos

(10) Patent No.: US 10,771,257 B1
(45) Date of Patent: Sep. 8, 2020

(54) DISTRIBUTED DATA RECORDS

(71) Applicant: Oracle International Corporation, Redwood Shores, CA (US)

(72) Inventor: Lucio D'orazio Pedro de Matos, Antelope, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/530,224

(22) Filed: Aug. 2, 2019

Related U.S. Application Data

(63) Continuation of application No. 16/448,299, filed on Jun. 21, 2019.

(51) Int. Cl.
| | |
|---|---|
| *H04L 9/32* | (2006.01) |
| *H04L 9/30* | (2006.01) |
| *H04L 9/08* | (2006.01) |
| *H04L 9/06* | (2006.01) |

(52) U.S. Cl.
CPC .......... *H04L 9/3247* (2013.01); *H04L 9/0643* (2013.01); *H04L 9/0838* (2013.01); *H04L 9/30* (2013.01)

(58) Field of Classification Search
CPC ....... H04L 9/3247; H04L 9/30; H04L 9/0838; H04L 9/0643
USPC ........................................................ 713/168
See application file for complete search history.

(56) References Cited

U.S. PATENT DOCUMENTS

| | | | | |
|---|---|---|---|---|
| 2008/0162946 | A1* | 7/2008 | Lohman | G06F 21/6227 713/193 |
| 2016/0292680 | A1* | 10/2016 | Wilson, Jr. | G06Q 20/40 |
| 2016/0300234 | A1* | 10/2016 | Moss-Pultz | G06Q 20/3827 |
| 2017/0206523 | A1* | 7/2017 | Goeringer | G06Q 20/409 |
| 2019/0050851 | A1* | 2/2019 | Kud | G06Q 20/10 |
| 2019/0058599 | A1* | 2/2019 | Takada Chino | H04L 9/3249 |
| 2019/0080392 | A1* | 3/2019 | Youb | G06Q 40/00 |
| 2019/0102782 | A1* | 4/2019 | Diehl | H04L 9/3263 |
| 2019/0333033 | A1* | 10/2019 | Finlow-Bates | G06Q 20/0658 |

OTHER PUBLICATIONS

International Search Report and Written Opinion that issued in the corresponding International Application No. PCT/US2019/044837, dated Feb. 25, 2020.

* cited by examiner

*Primary Examiner* — Samson B Lemma
(74) *Attorney, Agent, or Firm* — Potomac Law Group, PLLC

(57) ABSTRACT

Embodiments verify a digital asset by a first owner of the digital asset in response to a first transaction with a creator of the digital asset, the first owner having a corresponding first owner private key and a first owner public key. Embodiments receive a first digital record that corresponds to the digital asset. The first digital record includes an initial portion including initial parameters and a creator public key of the creator, and an appended initial digital signature computed using the initial parameters, the creator public key, and a creator private key of the creator. The first portion includes first parameters. Embodiments extract from the first digital record the creator public key, extracts from the first digital record the first digital signature and extracts from the first digital record the initial portion, the initial digital signature, and the first portion.

20 Claims, 9 Drawing Sheets

DISTRIBUTED DATA RECORDS

CROSS-REFERENCE TO RELATED APPLICATIONS

This application claims priority to U.S. patent application Ser. No. 16/448,299, filed Jun. 21, 2019, the disclosure of which is hereby incorporated by reference.

FIELD

One embodiment is directed generally to a data records, and in particular to distributed data records and electronic ledgers.

BACKGROUND INFORMATION

Traditionally, for keeping track of electronic records or contracts, a centralized database keeps track of all assets, owners, transactions, etc. Digital assets, or data records, such as electronic consumables, tokens, points, currencies, titles, event tickets, vouchers, coupons, etc., often need to be transferable in a peer-to-peer fashion, enabling people to negotiate asset transfer of ownership directly, using a trusted platform that is not controlled by one party. Blockchain, which includes a decentralized and public ledger, provides one solution, but has specific challenges such as a high compute cost and limited storage since many nodes have to store a complete transaction history. Therefore, projects that require massive storage end up requiring centralization, making public blockchain completely unsuitable.

SUMMARY

Embodiments verify a digital asset by a first owner of the digital asset in response to a first transaction with a creator of the digital asset, the first owner having a corresponding first owner private key and a first owner public key. Embodiments receive a first digital record that corresponds to the digital asset. The first digital record includes an initial portion including initial parameters and a creator public key of the creator, and an appended initial digital signature computed using the initial parameters, the creator public key, and a creator private key of the creator. The first portion includes first parameters where a first parameter includes the first transaction assigning ownership of the digital asset from the creator to the first owner and includes a first field that specifies the first owner public key and the creator public key, and an appended first digital signature computed using the initial portion, the initial digital signature, the first portion and the creator private key. Embodiments extract from the first digital record the creator public key, extracts from the first digital record the first digital signature and extracts from the first digital record the initial portion, the initial digital signature, and the first portion. Using a verification function, and the extracted creator public key, the first digital signature and the initial portion, embodiments then confirm that the first digital signature was computed using the creator private key.

DETAILED DESCRIPTION

Figure 1:
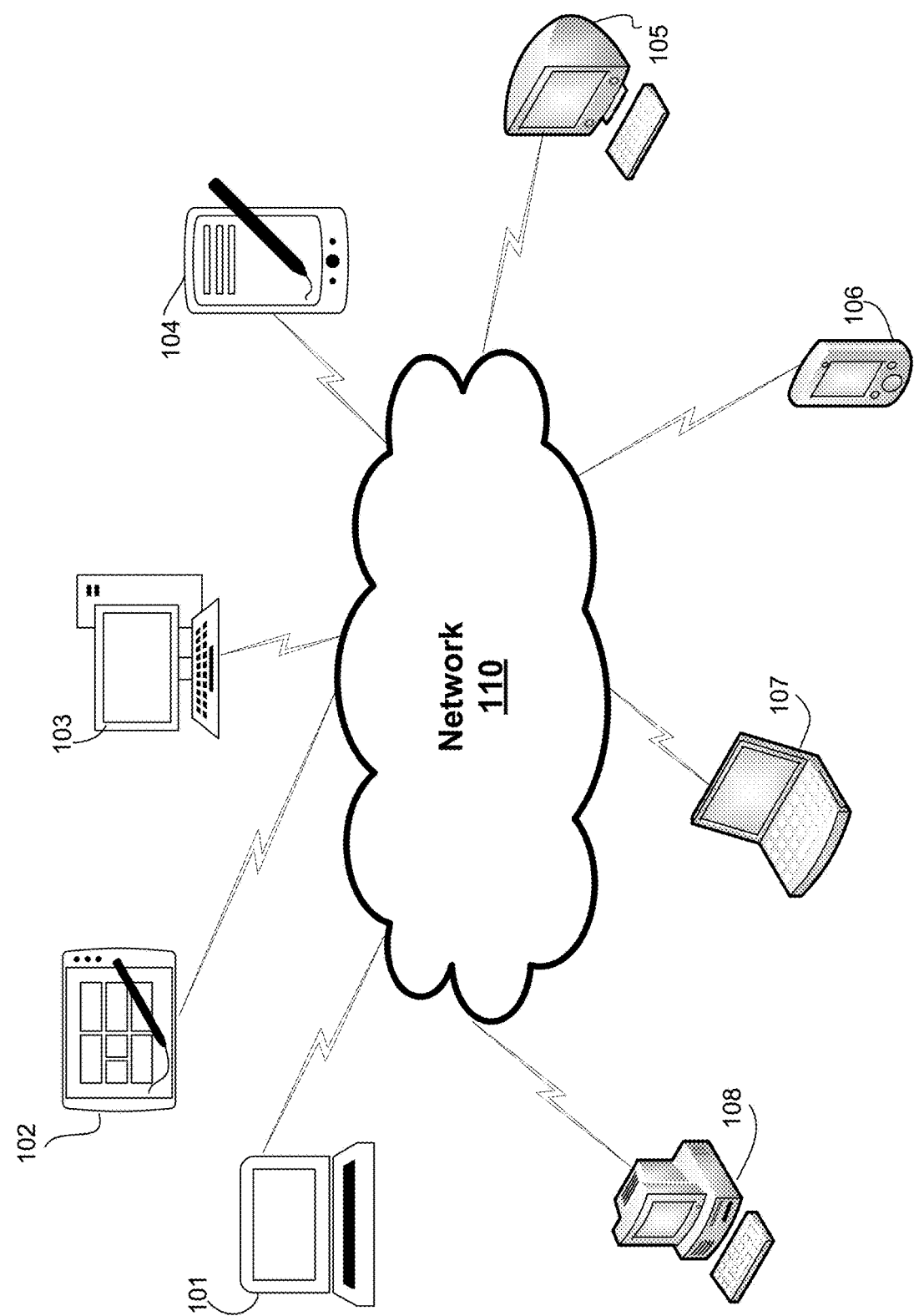
FIG. 1 is an overview diagram of elements that can implement embodiments of the invention.

Embodiments are directed to a ledger database made up of standalone files rather than a central database. Embodiments provide a system of data records or certificates in which information is not kept in a centralized database instance, but is maintained individually on separate devices, and each user is responsible for managing their own records. Users are custodians of the individual records that they own, and may be able to execute data updates on their records, in a manner that can be trusted by all participants.

In embodiments, the data records are maintained by each of the individual owners/users of the data in their respective devices. The devices that correspond to each owner of data records and are used to store the data records may include, for example, computer devices, smartphones, a Universal Serial Bus ("USB") storage stick, email or online storage, or even data records printed to paper or saved as a two-dimensional Quick Response ("QR") Code image. Each data record in embodiments, as disclosed in detail below, contains in itself sufficient information to deliver some of the same features provided by a traditional centralized database instance, such as: (1) assure that the origin of the record is true; (2) enforce what updates are allowed and not allowed; (3) attest the current state of the record (i.e., the current value of each record parameter, including the current owner of the record); (4) maintain a history of transactions to prove how the current state became what it is; and (5) provide security so that record changes cannot be made by an unauthorized user.

Instead of using a costly system of record storage, such as a common database that is duplicated at each node (i.e., a known blockchain system), in embodiments each asset tracks itself. Instead of database nodes managing all record information and transaction history, such as with blockchain, in embodiments data records circulate the world freely, managing their own ownership and status.

For example, in embodiments, if Alice sends a digital "coin" (i.e., a digitally signed computer file) to Bob, that coin (or file) keeps within itself its own signed history, proving its authentic origin and ownership. Whether the digital asset in question is a sum of coins, tokens, a title, a ticket, a voucher, a coupon, etc., each individual asset carries its own history in itself, digitally signed, in a way that the digital asset/record speaks for itself without the need to log transaction details in a master database. The whereabouts of an asset can be completely unknown to the public. There may be no public knowledge of who currently owns what asset. Instead, a file, likely kept by its owner, is what is keeping track of an asset. However, in embodiments, encryption makes it extremely difficult to "cheat." With embodiments, users are custodians of their own ledgers, but they cannot temper with it, or modify its value in a manner that is not allowed.

Embodiments are implemented using digital signatures, such as Elliptic Curve Digital Signature Algorithm ("ECDSA"), where record creation and transactions are signed by a secret private key, and verified by a related public key. A record is created and signed by its creator's private key, leaving a signature string that can be used to verify the signature. The next transactions, or record updates, will again be signed, producing a signature of a record that includes the previous signatures as part of the signed content. Each time the record is updated, it will again produce a signature of a record that contains all previous signatures, creating a chain of signature on top of signature, so that if any portion of the history is tempered with, a signature will not match the expected value during verification. In addition, the record also includes metadata describing what updates and allowed, forbidden, or required. These rules, written in metadata, are also protected by the signature (i.e., if the rule text is altered, the signature will not pass verification). Embodiments are novel in part because the verification of a record requires both the verification of signatures and the verification of compliance to any pre-defined transaction rules together. A record is only true if both verifications pass.

FIG. 1 is an overview diagram of elements that can implement embodiments of the invention. Embodiments are directed to individual devices 101-108 that can communicate with each other, on a continuous or intermittent basis, through a network 110. Each device 101-108 is any type of device that includes a processor/controller for executing instructions (or a hardware implementation), a storage device for storing files, and a communication device for communicating with other devices. Devices 101-108 can include desktop or laptop computers, servers, smartphones, tablets, watches, etc. Network 110 can be any type of communication mechanism, such as the Internet or a local network, or a combination of different networks. In embodiments disclosed below that use a third party validator, one of the devices of FIG. 1 function as the validator.

Figure 2:
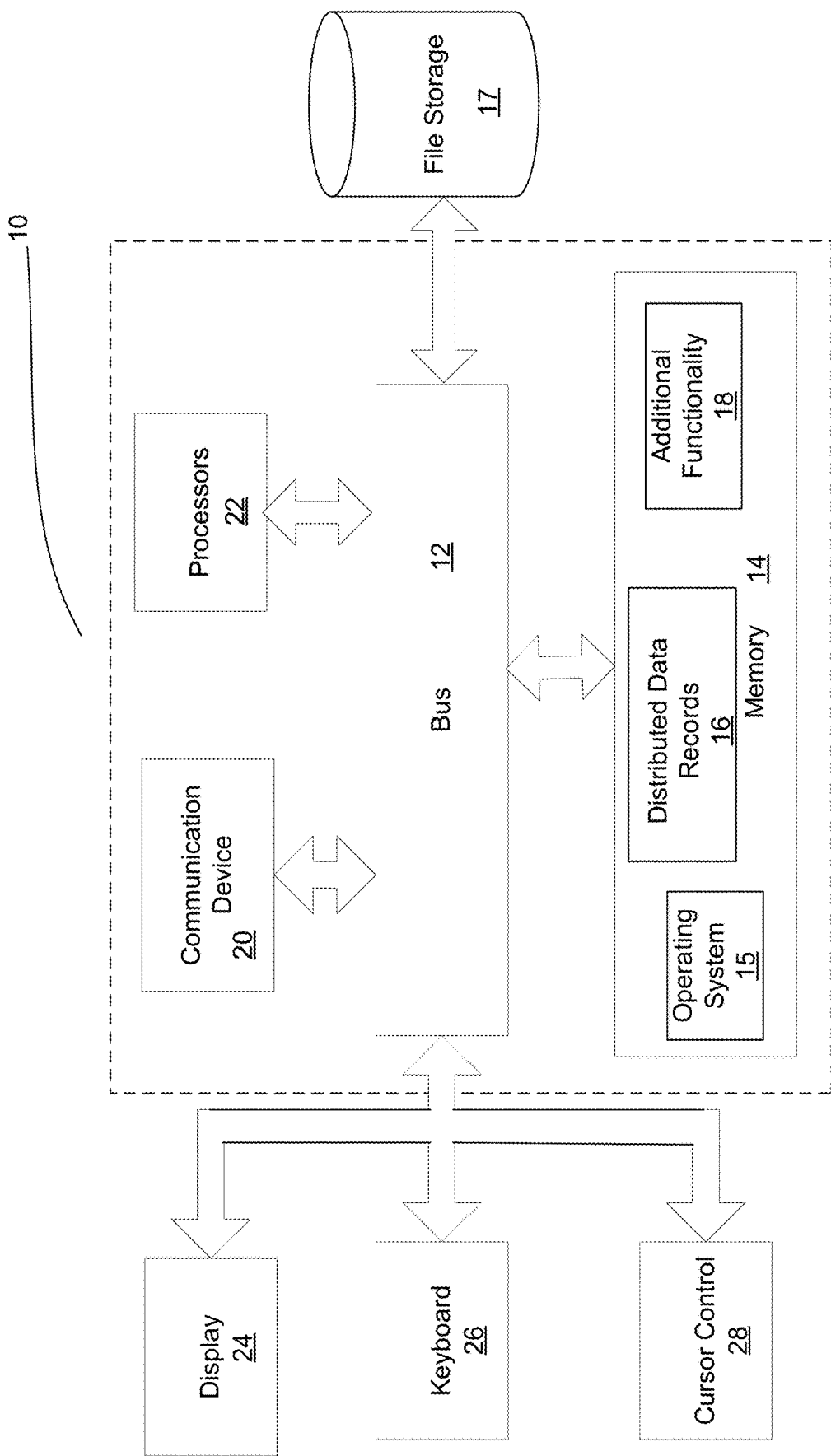
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. Multiple system 10s can provide the functionality for all of the elements of FIG. 1.

System 10 includes a bus 12 or other communication mechanism for communicating information, and a processor 22 coupled to bus 12 for processing information. Processor 22 may be any type of general or specific purpose processor.

System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a distributed data records module 16 that provides the distributed data records functionality for the respective device, and all other functionality disclosed herein. System 10 can be part of a larger system. Therefore, system 10 can include one or more additional functional modules 18 to include the additional functionality, such as a transaction based system, a digital wallet, or any other type of app that utilizes digital assets. A file storage device or database 17 is coupled to bus 12 to provide centralized storage for modules 16 and 18 and the data record files and any other necessary data, such as a digital signature. In one embodiment, database 17 is a relational database management system ("RDBMS") that can use Structured Query Language ("SQL") to manage the stored data.

In one embodiment, particularly when there are a large number distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As disclosed, embodiments provide distributed assets/records in which each distributed asset speaks for itself and also carries metadata that controls what types of transactions are allowed. This is in contrast to Blockchain systems which rely on a shared ledger that functions as a complete ledger of all of the assets (as opposed to just one asset) and is stored by each user. In embodiments, the digital asset functions as a distributed data record and a third-party validator is used for validation.

Distributed Digital Data Record

A digital record, digital asset, or "certificate file" certifies that someone owns something. In the context of embodiments of the invention, certificate files represent assets such as tickets, coins, data, vouchers, digital art, electronic devices, tangible objects, or even services. The certificate file contains an owner address associated with a secret private key capable of signing for that address. The asset is represented as a chain of digital signatures. A transaction is recorded by its owner digitally signing a hash of the previous transactions and parameters of the next state, and appending a public key, creating a verifiable chain. In blockchain-based ledgers, this signature chain is recorded on the blockchain servers. In contrast, with embodiments, each certificate carries this signature chain in itself, on the user's device.

As an example, Alice could initiate a set of 100 certificates of authenticity that will be given to the purchasers of 100 custom guitars that she made. Bob could initiate a pool of 200,000 "BobCoins". Carol could initiate a pool of food and beverage tickets for a fair. These assets would be traded peer-to-peer as certificate files. Using wallet apps and QR codes, these items can be acquired, used, gifted or sold, and their certificates can be transferred to new addresses, even divided or consolidated among other addresses, giving origin to successive certificate files. Each subsequent certificate file contains a verifiable signature history of its own pedigree.

Therefore, if Dave owns an asset that is tracked by a distributed data record file, Dave can store that file anywhere he wants. When Dave decides to transfer or redeem that record, his wallet app will provide a digital signature authorizing the parameters of the new record file. With embodiments, once Dave makes that transaction, his old record file must become invalid. A relatively small amount of online digital information will make it so that Dave can no longer reuse the old record file ever again, because the whole world must know that the old file is no longer accepted. Otherwise, Dave would be able to double-spend.

The Third Party Validator Repository

In embodiments, digital records/assets/certificates are standalone digital files. However, in some embodiments, their proof of integrity may require a relatively small amount of digital information to be online and available over a network (e.g., a validator server) in the form of a cryptographic checksum of each currently valid certificate. A certificate is valid if its checksum digest exists in a repository. Embodiments prevent double-spending by ensuring that when a signed transaction is posted, the checksum digest of the parent certificate is deleted from the repository, as the checksum digest of the new child certificates are inserted.

Embodiments do not provide a distributed consensus algorithm. For a private or joint ledger, the validator (or checksum digest repository) could be a private distributed database. For decentralized ledgers, this repository should operate on top of a decentralized algorithm such as blockchain smart contracts, Hashgraph, or other. Regardless, the entity operating the validating repository is not able to issue counterfeit certificates, for it has no control over assets, addresses, or keys. The repository is not a mint authority as it only manages obscure checksum hash values. Its only purpose is to stop double-spending, and it requires very little storage to do so, no matter how large the digital assets are in bytes. Privacy is unsurpassed because a list of checksum hash digests in the repository cannot provide any useful information.

Creating and Verifying Electronic Data Records/Assets

Figure 3B:
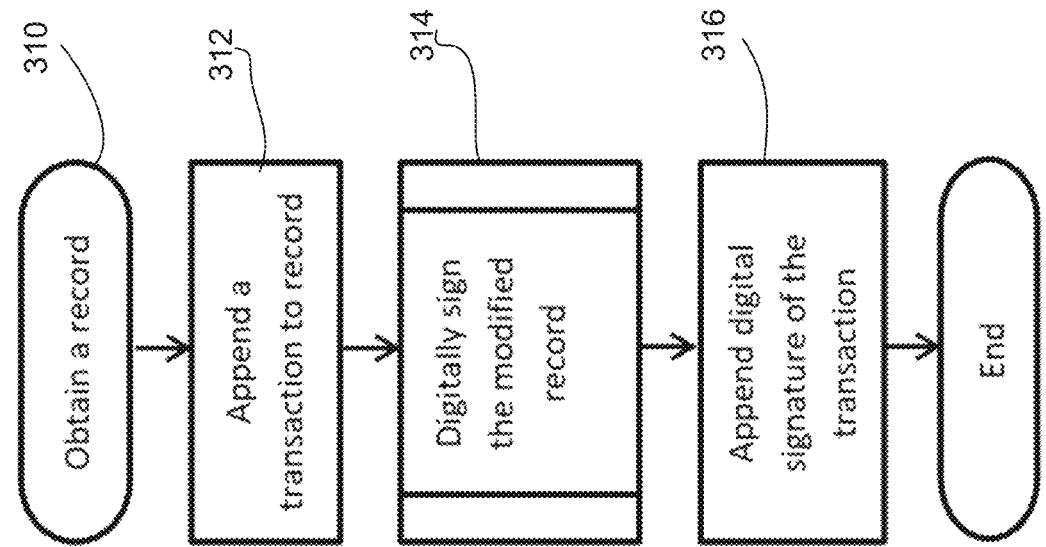
FIG. 3B is a flow diagram of the functionality of the distributed data records module of FIG. 2 when executing transactions with an electronic record in accordance with one embodiment.
Figure 3A:
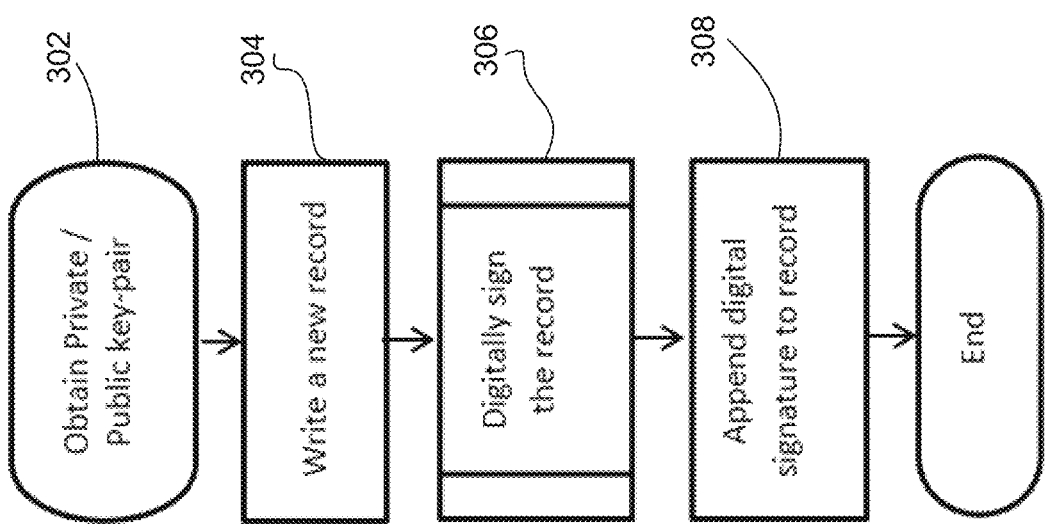
FIG. 3A is a flow diagram of the functionality of the distributed data records module of FIG. 2 when creating a new electronic record/digital certificate in accordance with one embodiment.

FIG. 3A is a flow diagram of the functionality of distributed data records module 16 of FIG. 2 when creating a new electronic record/digital certificate in accordance with one embodiment. In one embodiment, the functionality of the flow diagram of FIG. 3A (and FIGS. 3B and 4-9 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, a private/public key pair (e.g., an elliptic curve digital signature key pair) of the record creator is obtained. At 304, a new electronic record that includes at least one parameter, described in more detail below, is written. At 306, using the record creator's private key and the entire record information as a message text, including the creator's public key, a digital signature is computed, which will result in a signature hash value. At 308, the digital signature value is appended to the record.

As an example of the functionality of FIG. 3A, a digital record is as follows:

{
"message": "Hello world!",
"creator":
"38FBF6P8VT33IV8TDT6APUD1G4UHVTRUN6OYA
JPQA4QUTFX7Q6QH49ZDF53FRAUHOR137MY1Q
SKIVRWYHTLSSQ2NZR9B8",
"signature":
"7O6PRLXXB4ZFPPHK9X258SMV4OY2UKQVDR87
ZNL9F7PNH06L0O5EZ8WHTZ6UVGZZ1IDPPJ97JV1H
GK31MIPJQK7RZU01QY3T0CV"
}

The above digital record example, and all other examples herein, are in JavaScript Object Notation ("JSON") for readability. However, the records can be in any format, including a data record with fields delimited by a special character (such as comma-delimited or tab-delimited files), or delimited by tags (e.g., Extensible Markup Language ("XML"), or delimited by fixed width, or by row number. Records can be human-readable text or non-human-readable, such as binary or compressed formats. Records do not have to be represented as a computer file, as they may be information in Read Access Memory ("RAM") or information stored as a segment of a larger data set such as contents of a database. Because JSON is used in the disclosed examples herein, it is noted JSON is by definition not sorted. JSON records can have parameters in different order and still be considered equal. Since embodiments employ the use of digital signature and checksum hashes, the record must be consistently the same in all parts of the process, by all clients. This means that, if using JSON format (or any unsorted format), every participant would have to handle parameters in identical order and formatting (indentation, newlines, etc.), in order to ensure that signatures, checksums, and validations are deterministic, always achieving the same result.

The above digital record has a parameter "message", with a value "Hello word!" The record shows the public key of the "creator", and also a digital signature that was computed using the secret private key of the creator.

In the below second example, the record includes more parameters. While creating, the creator has already assigned ownership of the record to another key pair, and then signs it:

```
{
"title": "Pearl Jam live at Radio City", "event_date" : "Mar 15, 2022", "row":" W", "seat":"15",
"creator":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B8 ",
"transfers": [
   {
"from":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B8 ",
    "to":
"38FBF6P8VT33IV8TDT6APUD1G4UHVTRUN6OYAKOYLBNZOERI12DJAKO2AN2OV944QNENE54UH
M495LG19AALB9IKFI1N",
    "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
   }
  ]
}
```

The digital signature is computed using the private key and the entire contents of the record as the message to sign. The transaction parameter "to" is part of the message to be digitally signed. The signature:

"signature":

"7O6PRLXXB4ZFPPHK9X258SMV4OY2UKQVDR87Z NL9F7PNH06L0O5EZ8WHTZ6UVGZZ1IDPPJ97JV1HG K31MIP JQK7RZU0IQY3T0CV"

is then appended to the record. The record is then saved, or sent to its intended destination.

FIG. 3B is a flow diagram of the functionality of distributed data records module 16 of FIG. 2 when executing transactions with an electronic record in accordance with one embodiment.

At 310, the relevant record is obtained (i.e., retrieved from storage). At 312, the new transaction, such as a transfer of ownership and/or changes to the value of one or more parameters, is appended to the record. At 314, the modified record is digitally signed using all information on the record as an input message, including all previous transactions and signatures, and including details about the current transaction. At a minimum, the information being signed (i.e., the input message into a signing algorithm) must include at least the most recent, previous signature, since it already attests everything that happened before, and the details about the current transaction, such as modified parameter values or change of record ownership. However, in some embodiments, all previous transactions and signatures, or even the record's parameters values, may be further included as part of the message being signed. The private key of the current record owner is used to compute a digital signature. At 316, the digital signature value is appended to the record, as part of the current transaction.

As an example of the functionality of FIG. 3B, assume a record is received already containing one signed transaction. After appending a second and a third transaction with digital signatures, the record could look like this:

```
{
"title": "Pearl Jam live at Radio City, Mar 15, 2022, row W seat 15",
"issuer":"38FBF6P8VT33IV8TDT6APUD1G4UHVTRUN6OYAJPQA4QUTFX7Q6QH49ZDF53FRAUHOR1
37MY1QSKIVRWYHTLSSQ2NZR9B8 ",
"transactions": [
   {
"transaction_id":1,
"type": "transfer",
   "from":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B8 ",
    "to":
"38FBF6P8VT33IV8TDT6APUD1G4UHVTRUN6OYAKOYLBNZOERI12DJAKO2AN2OV944QNENE54UH
M495LG19AALB9IKFI1N",
    "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
   },
```

```
{
"transaction_id":2,
"type": "change_title",
   "from": "Pearl Jam live at Radio City, Mar 15, 2022, row W seat 15",
   "to": "Pearl Jam live at Radio City, Mar 16, 2022, row W seat 15",
   "signature":
"LKSFD09823KJ4SD98F74K5J6MNFDV8D78FDK4JD8DJRKJLKUY76ZYXCGSVBVG1U76FOSIKD54GJ
D0F9G09URLJSLDUFO8UDFU9S8D"
   },
   {
"transaction_id":3,
"type": "transfer",
   "from":
"38FBF6P8VT33IV8TDT6APUD1G4UHVTRUN6OYAKOYLBNZOERI12DJAKO2AN2OV944QNENE54UH
M495LG19AALB9IKFI1N ",
   "to":
"FGSDF9G8SFDG7652JK3H4KJNXCVSDU987324JK5NKSDJF89D7I3L4J5LI7DF8OI3J4L5KJDF9OUL4K
RJLKHFASDFYTSAD761QA",
   "signature":
"LKSFD09823KJ4SD98F74K5J6MNFDV8D78FDK4JD8DJRKJLKUY76ZYXCGSVBVG1U76FOSIKD54GJ
D0F9G09URLJSLDUFO8UDFU9S8D"
   }
  ]
}
```

In the example above, the record already had one transaction, which was a transfer of ownership. A second transaction was added to the record, to make an update to the "title" parameter, and then a third transaction to make another change of ownership. Subsequent transactions can be performed again and again by repeating the steps above, and the record will be increased with signed transactions recorded one after the other. The value of the most recent signature is the product of a calculation that includes all previous signatures as part of the input. If somebody was to modify anything anywhere in the file, the last digital signature would become unverifiable or invalid.

In the example above, the record had multiple transfers of ownership. In this case, the current owner of the record is whoever controls the private key associated with the public key in the "to" field of the latest transfer. That is the public/private key pair that currently controls the record in this example.

Some embodiments allow for multiple owners to own a record at the same time. In such cases, the owner of a record can be identified by a plurality of addresses, or public keys if not using derived addresses. For example, the owner could be represented by an array of address strings separated by comma. When this is the case, a record could require that any, or some, or all of the owners sign a transaction. To accomplish a transaction that involves multiple owners, one owner would sign the transaction, producing a digital signature and appending it to the record, then pass the resulting record to the next owner(s) to sign the same transaction and append their signatures as well. A transaction would be considered finalized after all required owners have signed it. In such embodiments, verifying transactions would respectively require validating each of the plurality of transactions signed by the plurality of owners.

Figure 4:
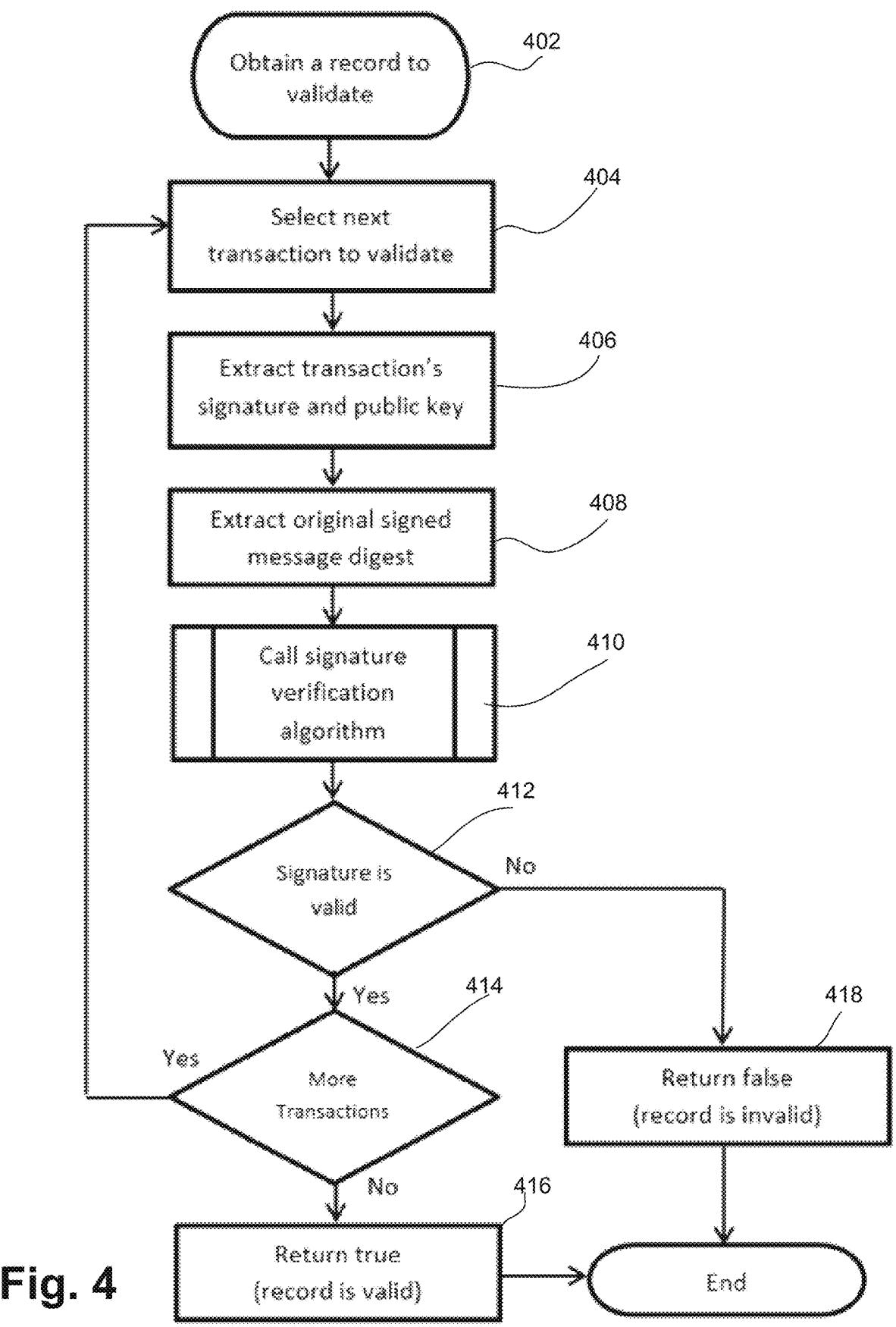
FIG. 4 is a flow diagram of the functionality of the distributed data records module of FIG. 2 when verifying an electronic record in accordance with one embodiment.

FIG. 4 is a flow diagram of the functionality of distributed data records module 16 of FIG. 2 when verifying an electronic record in accordance with one embodiment.

At 402, the electronic record to validate is obtained. At 404, the first (or next) transaction to validate is selected. If the record contains multiple transactions, the process can start with any, as there is no particular order required. At 406, the signature hash value and the public key string are extracted from a signed transaction of the record. These two values will be used as input in a function to verify if the signature is valid. To verify the signature, embodiments must obtain an input message identical to the one that was used at the time of signing. To do this, the signature string is removed, since it did not yet exist at the time of signing, and all transactions that occurred after the one being verified at this point are removed. The functionality of 404 and 406 can be done in any order.

At 410, now that three important pieces of information have been obtained, a signature verification algorithm is called/executed to verify if the digital signature is valid. As discussed, the three pieces of information are: (1) A copy of the original message that was signed, which was the record state at the time of signing; (2) the public key corresponding to the secret private key (pair) used to sign the input message of the one who signed it; and (3) the signature hash value that was recorded on the transaction. With these three elements, a function can be executed that will confirm if the signature was actually produced with a secret private key that corresponds to the public key. Therefore, embodiments avoid the need to know the private key of the creator of the record or the creator of any subsequent transactions. In one embodiment, the function used is the Elliptic Curve Digital Signature Algorithm, but other algorithms can be used. It is assumed that the signing algorithm is known by all participants. For example, if a record is signed and verifying using Elliptic Curve Digital Signature Algorithm, it is assumed that the curve is known by the program verifying the file, since no curve was specified in the file.

At 412, if the function at 410 confirmed that the signature was indeed produced with a private key that corresponds to the public key, using the exact same message, then functionality proceeds to 414. If the verification fails, then at 418 the functionality ends after returning failure (i.e., the record is not valid).

At 414, if there are additional transactions to validate, functionality continues at 404. Otherwise, at 416, a record is valid (i.e., validation success) is returned and the functionality then ends.

As an example of the functionality of FIG. 4, assume the following sample record with two transactions (both being transfers from one record owner to another):

```
{
"title": "Pearl Jam live at Radio City, Mar 15, 2022, row W seat 15",
"transfers": [
  {
   "id": 1,
   "from":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B8 ",
   "to":
"38FBF6P8VT33IV8TDT6APUD1G4UHVTRUN6OYAKOYLBNZOERI12DJAKO2AN2OV944QNENE54UH
M495LG19AALB9IKFI1N",
   "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
  },
  {
    "id": 2,
   "from":
"38FBF6P8VT33IV8TDT6APUD1G4UHVTRUN6OYAKOYLBNZOERI12DJAKO2AN2OV944QNENE54UH
M495LG19AALB9IKFI1N ",
   "to":
"FGSDF9G8SFDG7652JK3H4KJNXC,VSDU987324JK5NKSDJF89D7I3L4J5LI7DF8OI3J4L5KJDF9OUL4
KRJLKHFASDFYTSAD761QA",
   "signature":
"LKSFD09823KJ4SD98F74K5J6MNFDV8D78FDK4JD8DJRKJLKUY76ZYXCGSVBVG1U76FOSIKD54GJ
D0F9G09URLJSLDUFO8UDFU9S8D"
  }
 ]
}
```

To verify the record above, the functionality of FIG. 4 begins by checking one signed transaction. It could be either one (no particular order required), but in this example functionality begins with the first transaction.
1) The public key on the first transaction is:
"38FBF6P8VT33IV8TDT6APUD1G4UHVTRUN6OYAJPQA4QUTFX7Q6QH49ZDF53FRAUHOR137MY1QSKIVRWYHTLSSQ2NZR9B8"
2) The signature hash value on the first transaction is:
"7O6PRLXXB4ZFPPHK9X258SMV4OY2UKQVDR87ZNL9F7PNH06L0O5EZ8WHTZ6UVGZZ1IDPPJ97JV1HGK31MIPJQK7RZU0IQY3T0CV"
3) The original message input that was signed in the first transaction was:

```
{
"title": "Pearl Jam live at Radio City, Mar 15, 2022, row W seat 15",
"transfers": [
  {
   "id":1,
```
-continued
```
   "from":
"38FBF6P8VT33IV8TDT6APUD1G4UHVTRUN6OYAJPQA4QUTFX
7Q6QH49ZDF53FRAUHOR137MY1QSKIVRWYHTLSSQ2NZR9B8 ",
   "to":
"38FBF6P8VT33IV8TDT6APUD1G4UHVTRUN6OYAKOYLBNZOE
RI12DJAKO2AN2OV944QNENE54UHM495LG19AALB9IKFI1N",
  }
 ]
}
```

These three pieces of information are used to validate if the signature was indeed produced by use of the secret private key. If it passes the test, the same is done for all other transactions. However, transactions are verified using an input message that excludes all subsequent transactions but includes all previous transactions. Therefore, when testing the second transaction, the details about the first transaction will be part of the input message that was signed.

The extracted copy of the input message to validate the second transaction appears as follows in one example (without signature):

```
{
"title": "Pearl Jam live at Radio City, Mar 15, 2022, row W seat 15",
"transfers": [
  {
   "id":1,
   "from":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B8 ",
   "to":
"38FBF6P8VT33IV8TDT6APUD1G4UHVTRUN6OYAKOYLBNZOERI12DJAKO2AN2OV944QNENE54UH
M495LG19AALB9IKFI1N",
   "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
  },
  {
   "id": 2,
   "from":
"38FBF6P8VT33IV8TDT6APUD1G4UHVTRUN6OYAKOYLBNZOERI12DJAKO2AN2OV944QNENE54UH
M495LG19AALB9IKFI1N ",
```

```
  "to":
"FGSDF9G8SFDG7652JK3H4KJNXC,VSDU987324JK5NKSDJF89D7I3L4J5LI7DF8OI3J4L5KJDF9OUL4
KRJLKHFASDFYTSAD761QA",
   }
]
```

Using Addresses

In embodiments, an address is a hash value derived from the public key, or public portion of a key-pair. For example, when a record has ownership transferred to an "address", the public key of the recipient can remain secret in some embodiments until a future signature is made. This optional security measure may be needed because, depending on the digital signature algorithm used, it may be best to keep the public key secret until used. For readability of client applications, the record may also contain top-level parameters for the creator's address and current owner's address, so that the client application does not have to extract that information from the transaction history.

In embodiments that use this security measure, the functionality is similar to the functionality of FIGS. 3A, 3B and 4 except that key pairs controlling the record are identified by a hash of the public key as opposed to the public key itself.

Transaction Rules

In embodiments, an electronic record may include metadata to mandate allowed, forbidden, or required parameter value changes. For example, a numeric parameter may be required to always satisfy one or more mathematical comparisons, such as being equal to, and/or smaller than, and/or greater than, and/or different than one or more predefined values, or the value of another parameter, or function. A text parameter may be required to satisfy one or more formatting or value comparisons, such as having to meet a format mask, or regular expression, or having to match a value from another field, or values from a predefined list of allowed values. A date parameter may be required to have a value that is equal to, or greater than, or smaller than or different from a specific date, or range of dates, or the value of another date parameter.

A parameter value update can be required by rule. A record may include metadata mandating that one or more parameters be updated in response to certain events. For example, a record may require a numeric parameter called "transfer_counter" to be incremented by a predefined factor of 1 every time a transaction results in a change of record ownership, which could be used to enforce a limit on maximum number of transfers allowed.

The functionality for creating a record with parameter constraints is the same as creating a "basic" record as shown in FIG. 3A, except the record itself includes additional metadata that explains if one or more parameters must have values that satisfy any conditions.

An example record with parameter constraints is as follows:

```
{
    "Title": "Lionel Messi",
    "parameters": [
    {
       "name": "Speed", "type": "number", "value": 85, "readonly": true
    },
    {
       "name": "Ability", "type": "number", "value": 99, "readonly": true
    },
    {
       "name": "Status", "type": "text", "value": "Active", "readonly": false,
       "allowed": ["Active", "Injured", "Suspended", "Retired" ]
    },
    {
       "name": "Transfers", "type": "number", "value": 0, "readonly": true,
       "auto_increment": 1,
       "when": "owner changes",
       "max": 10
    }
    ],
    "creator_address": "5XA5AH7B0N5FEMGX72KFLRLMOGFWIFSUWMOOSXUO7FUL2SSA7HXU5Q3",
    "owner_address": "CIDK3FPH9SIGJWMEAGXSMBEPCOLFCZSIA1P25DRJSNPFWHAFEAK8NSIU",
    "transactions": [
    {
       "from": "5XA5AH7B0N5FEMGX72KFLRLMOGFWIFSUWMOOSXUO7FUL2SSA7HXU5Q3",
       "to": "CIDK3FPH9SIGJWMEAGXSMBEPCOLFCZSIA1P25DRJSNPFWHAFEAK8NSIU",
       "public_key":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B81TON9QLPCZLQXG363GB0WSXMOS1ZMO5",
       "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
    }
    ]
}
```

In the above record, each parameter has some rules specified. The parameters "Speed" and "Ability" are read-only and cannot be modified. The parameter "Status" can be modified but must match a predefined list of text values. The parameter "Transfers" is read-only, and cannot be deliberately modified by a user, but it is required to increment by a factor of 1 every time a transaction changes owners, and it also has a max value of 10. Therefore, after the record is transferred 10 times, the record can no longer be transferred to a new owner, or else a condition will not be satisfied during validation.

These rules, as implemented by parameter values, are documented in the record and their text is signed by the record creator. Therefore, another user cannot modify the rule definition because it would make the creator's signature invalid. The rules are protected by the creator's signature.

To validate a record that includes parameter constraints, the functionality is similar to without the parameters, with one additional task: When validating transactions, each record parameter that has predefined transaction rules must be compared to check if all rule requirements are satisfied by the transaction, and return invalid if any transaction results in a parameter value that does not satisfy a rule defined by the record creator.

The verification functionality can be performed in any order, such as (1) Verify all signatures for all transactions first, then verify all rules for all transactions; (2) Verify all rules for all transactions first, then verify all signatures; (3) Verify rule compliance and a signature for each transaction, one transaction at a time; or (4) Verify signature and rule compliance for each transaction, one transaction at a time. The order is irrelevant as long as all signatures and all rules are verified.

Figure 5:
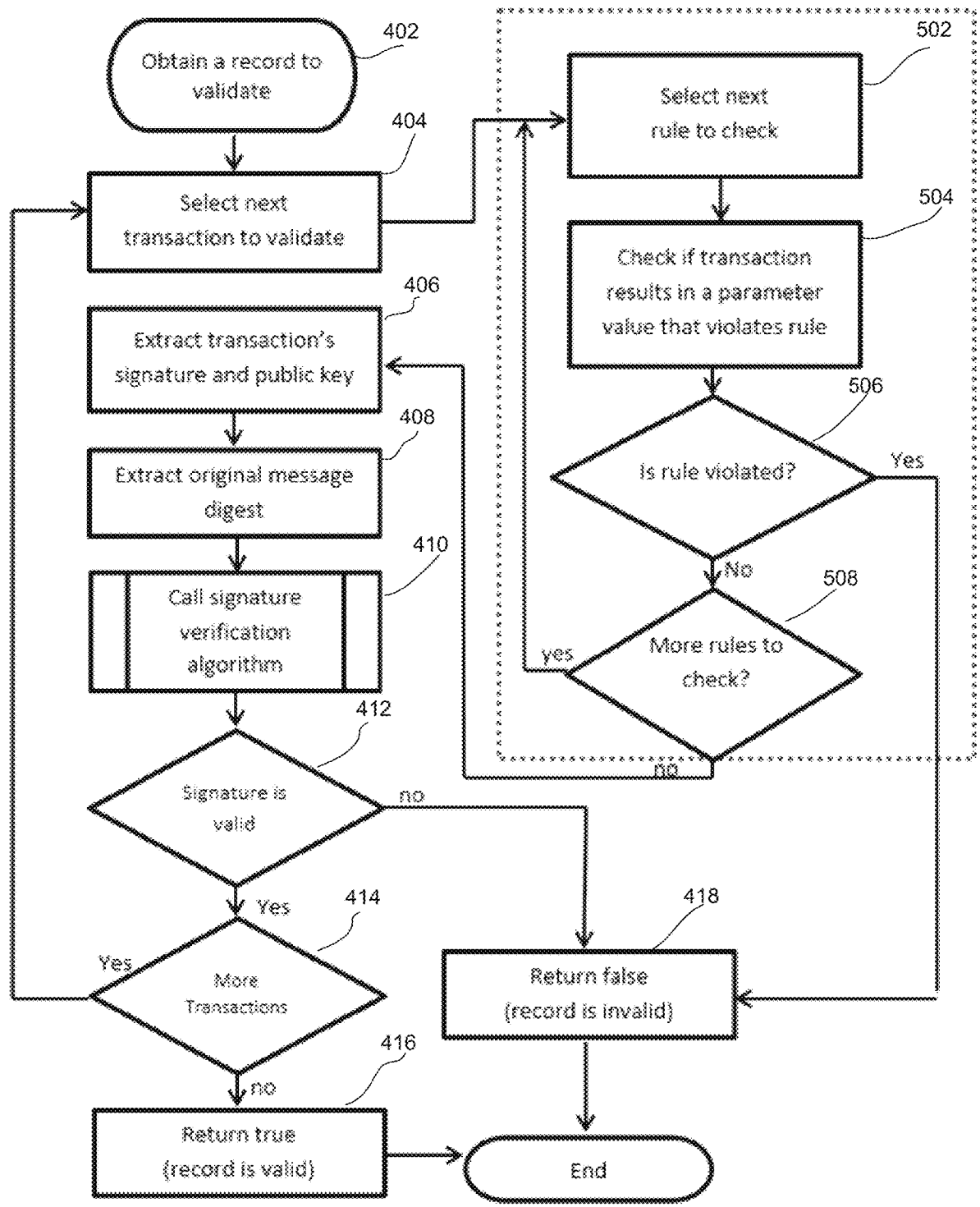
FIG. 5 is a flow diagram of the functionality of the distributed data records module of FIG. 2 when verifying an electronic record with transaction rules in accordance with one embodiment.

FIG. 5 is a flow diagram of the functionality of distributed data records module 16 of FIG. 2 when verifying an electronic record with transaction rules in accordance with one embodiment.

The functionality of FIG. 5 includes the same functionality of FIG. 4, with the addition of the following. At 502, the metadata is checked for any (or the next) rule to check. For example, it could be a parameter that has a maximum value allowed. At 504, the rule requirements are compared with transaction value changes. For example, if the rule specifies that the maximum transaction value allowed is 10, and the transaction has a value updated to 11. At 506, if a rule was violated, the record is invalid at 418. Otherwise, at 508, functionality continues at 502.

Third Party Validator

In embodiments, when an electronic record is updated, it is often required that the previous version of the record becomes obsolete and no longer valid. For example, if a record changes ownership, the old version, with the previous owner, should become invalid. Systems of records may need to be chronologically stateful in order to avoid race conditions or "double-spending". This can be solved by employing a third party validator. Record creations, transactions and verifications may be transmitted to a third party service that can identify if a record is obsolete or current. An online validator can confirm if a record is current or obsolete by maintaining a list of currently valid records. Its repository (which may be a file, directory, database or data structure) does not need to maintain an entire copy of each record, since it only requires nothing more than the checksum of each currently valid record out. A checksum can be a very short string. A record of any size can be confirmed to be valid if the checksum of the record exists in a validator repository.

In order to create a new record that is subjected to a third party validator, the functionality for creating the new signed record of FIG. 3A is implemented. Then, after the record includes a digital signature (i.e., after 308), the record is used as the input message to compute a checksum hash of the record, using a hash algorithm such as md5, keccak or SHA. The checksum is then inserted into an online repository or database, which may require credentials and creation privileges. The checksum in the validator repository will indicate that the record is legitimate.

Figure 6:
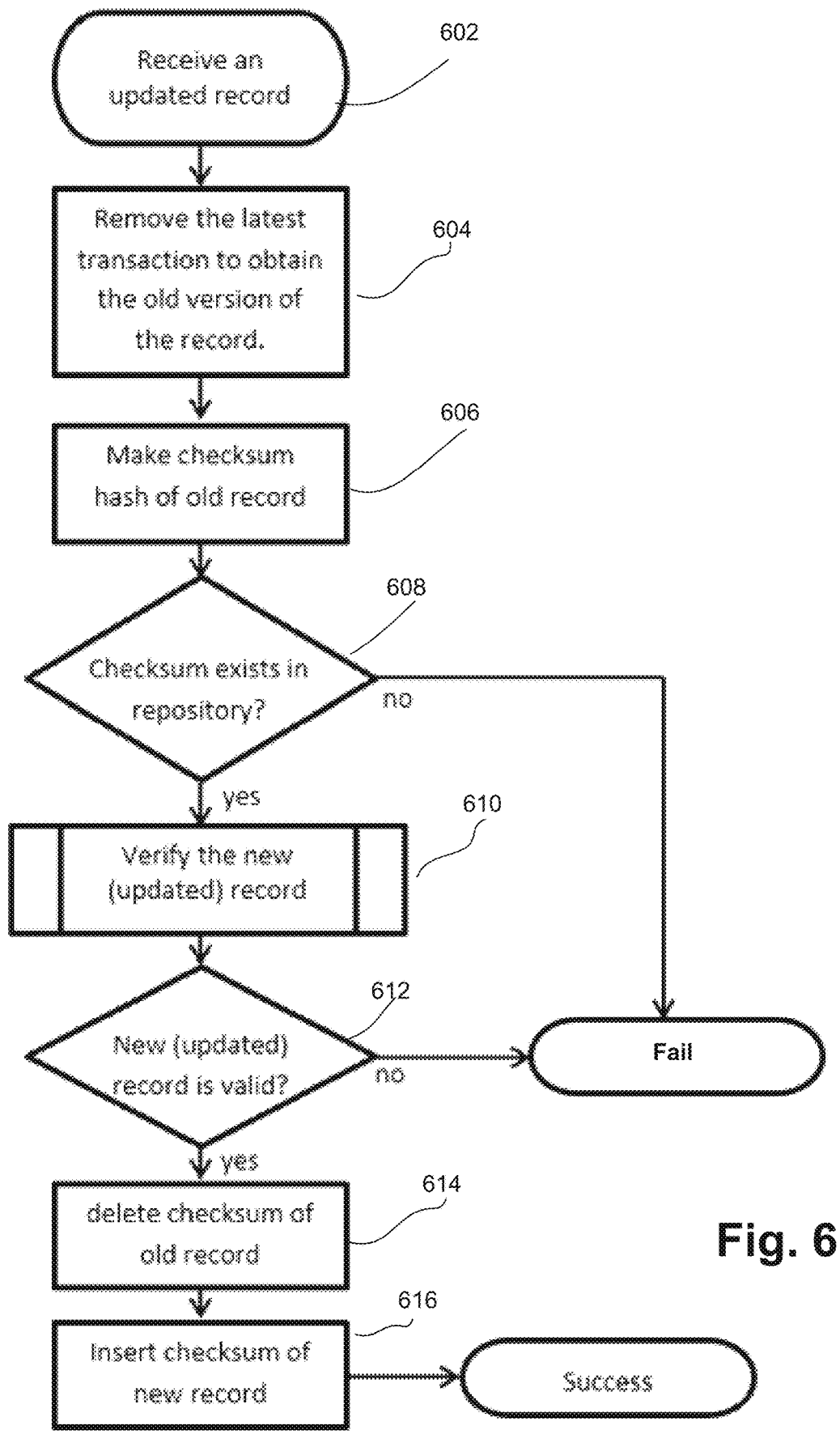
FIG. 6 is a flow diagram of the functionality of the distributed data records module of FIG. 2 when validating records by a third party validator in accordance with one embodiment.

FIG. 6 is a flow diagram of the functionality of distributed data records module 16 of FIG. 2 when validating records by a third party validator in accordance with one embodiment. The functionality of FIG. 6 is implemented after receiving at a third party an updated record that includes the third party validator checksum at 602.

At 604, there is a need to check if the old record receiving the update is actually valid. This is done by checking if the checksum of the old record exists in the repository. To do this, the latest transaction is removed from the record to obtain the old version of the record (i.e., prior to the transaction).

At 606, a checksum hash of the old version of the record is computed. At 608, if the checksum of the old record exists in the repository, then the old record is valid. If no at 608, the old record is invalid and the validation fails. For example, the old record may be already obsolete by another transaction that got posted first.

If yes at 608, at 610 the new updated record is verified using functionality of FIGS. 4 and 5, meaning check if the transaction signature is indeed signed with the private key of the current owner of the record, as well as checking for any potential rule violations. Since the checksum of the old record is already verified, it is not necessary to verify again all transaction history. Only the new transaction(s) need to be verified.

At 612, if the new (updated) record is valid, proceed to 614. However, if new transaction signatures are invalid, or rules have been violated, then the verification has failed.

Now that the old and new records have been verified, it is safe to remove the checksum of the old file at 614 and insert the checksum of the new file at 616. Depending on the type of data repository used, 614 and 616 can be consolidated into a single "update", instead of a "remove and insert". If using a remove/insert method, the database management system used may offer functionality to ensure atomic changes, meaning the delete and insert both succeed or both fail.

Using the functionality of FIG. 6, a requester may verify if a record is valid using a third party validator by performing two simple steps: (1) Compute a checksum hash of the record; and (2) Request the third party validator to confirm if the checksum is valid (exists) or invalid (not found).

In one embodiment, specifically when the online validator repository is completely trusted, such as in a private system, or reputable decentralized algorithm (e.g., an open source smart contract on a reputable decentralized system), then the signature chain can be omitted from the record. Since every transaction is validated by the online validator prior to repository updates, the signature chain can be implicit. In other words, if a checksum digest exists in the online repository, then all previous transactions must have been honorable, otherwise the checksum would not be found in the repository. This embodiment removes the need for records to maintain their complete transaction history. A system adopting this model would have to be designed and developed from the start to create and update records that exclude the transaction history as part of the record. This keeps the record file size from growing too large. It also provides ultimate privacy, if desired, since the previous owners of a record would be unknown. However, is only beneficial when the repository (online validator) can be trusted completely, which is not always the case. Moreover, in some use cases, the transaction history may still be needed for other reasons, such as validating that a record passed through expected ownership.

In some embodiments, the described system of records can operate with a specific software, with a single online validator, and a known creator key, and a known signature algorithm, and a known checksum algorithm. However, in other embodiments, a system of generic records are created, transacted, and verified using many different software (such as different smartphone wallets), many record creators, many algorithms used, and many validator services. Therefore, in embodiments, the electronic records may include the following additional parameters to facilitate a universal framework:

(A) A parameter for the HyperText Transfer Protocol ("HTTP") Uniform Resource Locator ("URL") of the creator, allowing users and client applications to verify the creator's address. For example, if company ACME.COM creates records, they may post a page on the ACME.COM domain to allow users and applications to obtain their official address or public key. A wallet app can inform the user that the record being inspected is signed using a key whose public portion is provided by ACME.COM.

(B) A parameter for the HTTP URL of the validator service (i.e., telling client applications where to verify the record).

(C) A parameter for the signature algorithm used. For example, if using elliptic curve, a parameter to indicate what curve is used, so that other applications are able to verify the file.

Some embodiments provide a security option to guarantee that the creator key can be used only once. This is desirable in case the secret private key of the creator became compromised, or when users want to be certain that the creator will not have the ability to create additional records using the same key, thus limiting the supply. To achieve this, the third-party online validator can add the creator's public key (or address if using addresses) to a list of previously used keys (or addresses). Prior to completing the creation of any new record, the third party validator can check if the creator's keys have been previously used to create past records.

Figure 7:
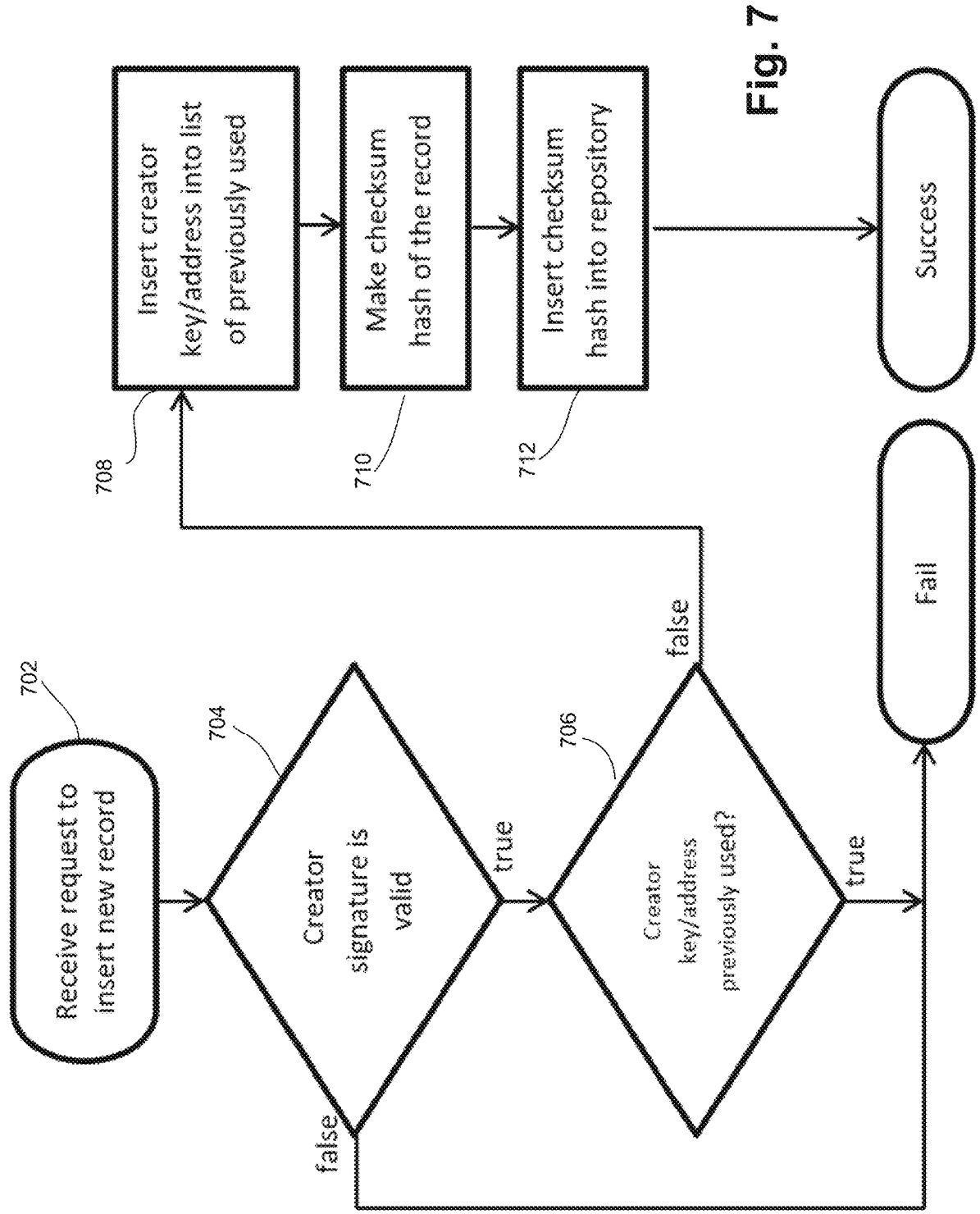
FIG. 7 is a flow diagram of the functionality of the distributed data records module of FIG. 2 when creating a new record that is subjected to a third party validator with additional security in accordance with one embodiment.

FIG. 7 is a flow diagram of the functionality of distributed data records module 16 of FIG. 2 when creating a new record that is subjected to a third party validator with additional security in accordance with one embodiment. The functionality of FIG. 7 is in addition to the functionality disclosed above for creating a new record that is subjected to a third party validator.

After receiving the request to insert a new record at 702, at 704 it is verified that the newly created record is correctly signed (i.e., the signature is verified against the creator's public key) and at 706 it is verified that the key of the creator has not been used before, by querying for it against a list, directory or database that tracks previously used keys or addresses. 704 and 706 can be executed in any order.

At 708, the creator's key (or address) is inserted into a list, directory, or database that tracks previously used keys or addresses. At 710, a checksum of the new record is created. At 712, the checksum is inserted into a list, directory or database of valid records.

Record Splits

In embodiments, records may have numeric parameters that are divisible. For example, a record representing an account may have a balance of points, currency, shares or any numeric figure that is divisible, which may be assigned in part(s) to other owner(s).

For example, Alice may control a record that has a "Points" parameter with value of "10". Alice may perform a transaction assigning 3 "Points" to Bob (his address) and 2 "Points" to Carol (her address). This transaction would result in a record that enables Bob's secret private key to control 3 "Points", while Carol's private key controls 2 "points" and Alice's private key retains control over 5 "Points". From that point on, they do not have to maintain a single copy of the record. They can each take their own copy and do what they want without the other two knowing about it.

A record split transaction is similar to transactions disclosed below, except the transaction details would include details about assignment of parts such as follows:

```
{
"Title": "Appreciation Kudos",
"parameters": [
   {
      "name": "Kudos",
      "type": "number",
      "value": 10,
      "divisible": true
   }
],
"creator_address": "5XA5AH7B0N5FEMGX72KFLRLMOGFWIFSUWMOOSXUO7FUL2SSA7HXU5Q3",
"transactions": [
   {
      "id":1,
      "type": "transfer",
      "from": "5XA5AH7B0N5FEMGX72KFLRLMOGFWIFSUWMOOSXUO7FUL2SSA7HXU5Q3",
      "to": "CIDK3FPH9SIGJWMEAGXSMBEPCOLFCZSIA1P25DRJSNPFWHAFEAK8NSIU",
      "public_key":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B81TON9QLPCZLQXG363GB0WSXMOS1ZMO5",
      "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
   },
```

```
{
    "id": 2,
    "type": "split",
    "source":"Kudos",
    "quantity": 3,
    "from": "CIDK3FPH9SIGJWMEAGXSMBEPCOLFCZSIA1P25DRJSNPFWHAFEAK8NSIU",
    "to": "SDJF8723I4SMNKSDF912KHJKSDFSDF987DKK2KJ34MSDFHISUDF97234",
"public_key":"SDF9078ADSFHL34HL5KJ2H98D76SIH435908D7FGJH32459087DSFGLKHJ324598DS7F
GLH3245987DSFG79854032LJSDFG987SDFGLK3J2LJDGFDK2JH34K2J3",
    "signature":
"KDIJD8D8EYUDNNBZZ76DS234987SDFDD8SJ74SJKHDDFJKSDHF89SDFKJWHERLKJSDLKSLASD
MBNXCMNBQIWU987219080USDF0"
    }
  ]
}
```

In the example above, a creator (5XA5AH . . . ) created a record with 10 "Kudos", which is a numeric parameter that can be divided and have its parts assigned to different owners. The creator recorded a transaction transferring ownership of the record to Alice (CIDK3 . . . ).

On a second transaction, Alice split the Kudos parameter, giving 3 "Kudos" to Bob (SDJF8 . . . ). From this point on, if this record receives a transaction signed by Alice doing something with 7 Kudos or less, it would be valid. If the record receives a transaction signed by Bob doing something with 3 kudos or less it will also be valid. Therefore, Alice and Bob can both give continuation to this record on different paths, which will eventually result in multiple files that are different from each other but still valid.

The split functionality disclosed above is useful when double-spending is not a concern and when the system of records does not require a third-party validator. In other embodiments, splits are performed that are resistant against double-spending, and validated by a third-party repository. In these embodiments, a split should result in multiple child records that are different from each other just enough to result in different checksum hash values. For example, if a record A is split into two parts, it should result in two new records B and C, where A, B and C produce distinct checksum values for the repository. After the split is recorded in the repository, the checksum of record A will be removed, and the checksums of records B and C will be found in the repository. It is also possible to split a record into more than two parts.

Figure 8:
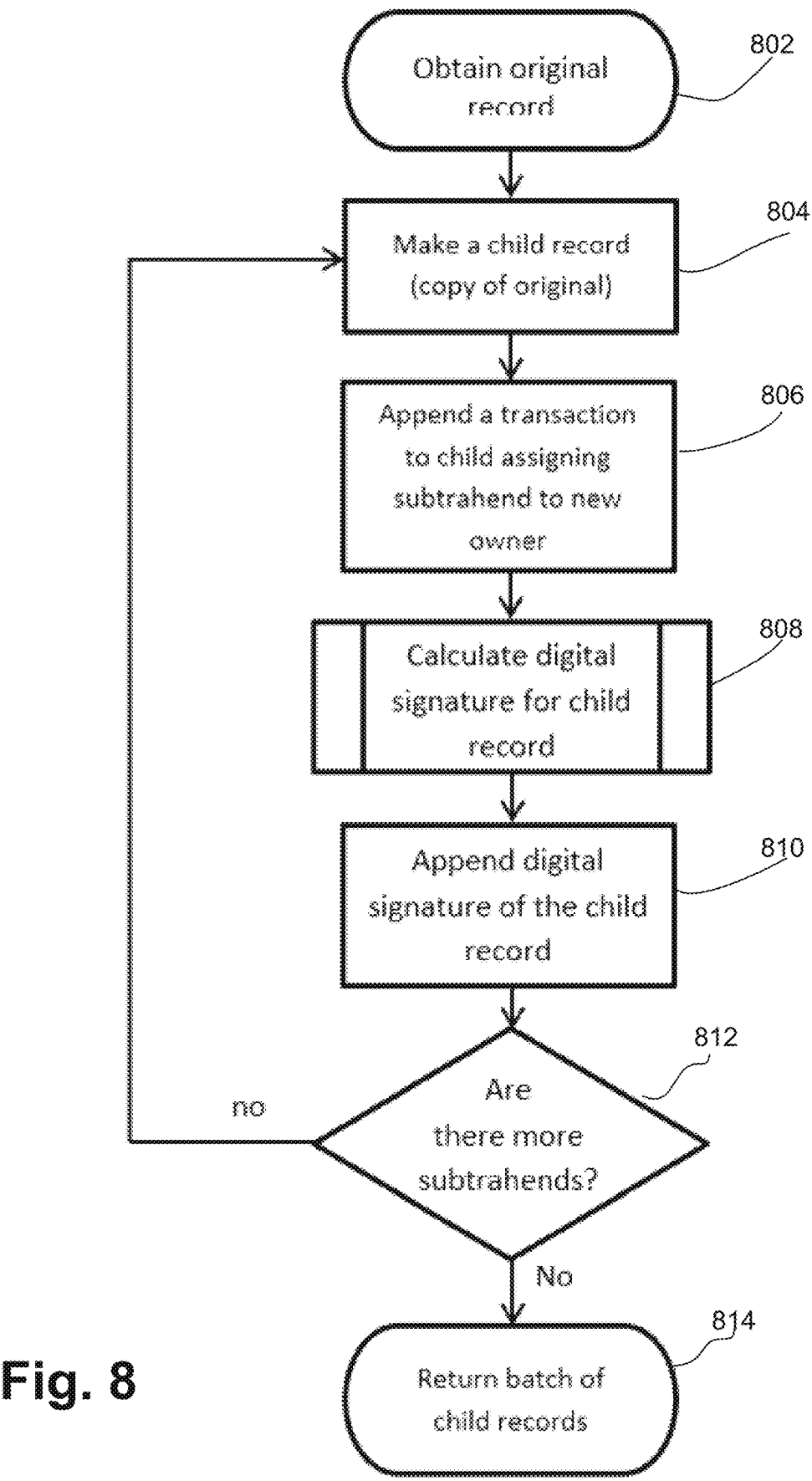
FIG. 8 is a flow diagram of the functionality of the distributed data records module of FIG. 2 when splitting a parameter into multiple child records in accordance with one embodiment.

FIG. 8 is a flow diagram of the functionality of distributed data records module 16 of FIG. 2 when splitting a parameter into multiple child records in accordance with one embodiment. As an example of the functionality of FIG. 8, assume that a record parameter contains an initial supply of 10, which will be the minuend. If the owner Alice gives 3 units to Bob, and 2 units to Carol, and 5 units she keeps to herself, the supply has been split with nothing left over as follows:

10 (minuend=original record)
−3 (subtrahend 1, for Bob=child record 1)
−2 (subtrahend 2, for Carol=child record 2)
−5 (subtrahend 3, Alice retains=child record 3)
=0 (difference)

For the functionality of FIG. 8, each part that is being deducted from the original amount is referred to as a subtrahend. Each subtrahend will result in a unique child record. The original record (starting point) will be reused as a starting copy for each child record.

After obtaining the original record at 802, at 804 for each subtrahend (a part being deducted from the original amount), a copy of the original record is made as a starting point. At 806, a transaction is appended to the child record assigning the subtrahend to the control of a public key or derived address. For example, if Alice gives 3 units to Bob, a transaction would be appended to the child record stating that 3 units were assigned to Bob's public key (or address).

At 808, the transaction from 806 is digitally signed with the secret private key that controls the record. At 810, the digital signature is appended to the transaction, completing the child record.

At 812, it is determined if there are more subtrahends in this transaction. Or in other words, are there more parts of the original amount being split, that still need to be recorded as a child record. If no at 812, functionality continues at 804. If yes at 812, functionality ends by returning a batch of multiple unique child records.

Figure 9:
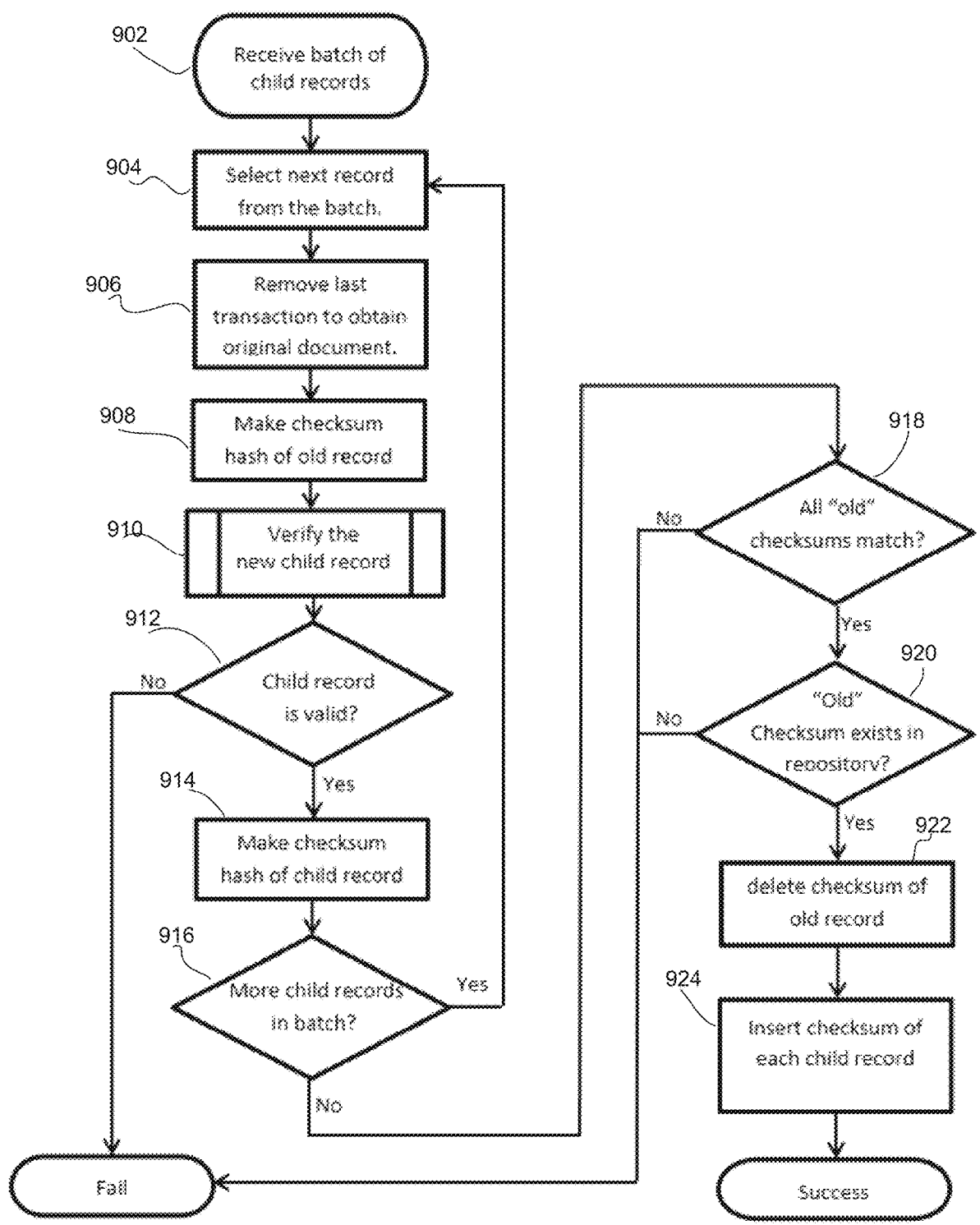
FIG. 9 is a flow diagram of the functionality of the distributed data records module of FIG. 2 when recording a split transaction in a validator repository in accordance with one embodiment.

In embodiments, when a transaction splits a record into multiple child records, recording them into a validator repository means that one old checksum hash will be removed, and many new checksum hashes will be added. FIG. 9 is a flow diagram of the functionality of distributed data records module 16 of FIG. 2 when recording a split transaction in a validator repository in accordance with one embodiment.

At 902, a batch of records are received. At 904, the next record in the batch is selected. At 906, the last transaction from the selected child record is removed. This is done in order to identify the original document (prior to split transaction) so that the original document can be checked if it was good to begin with.

At 908, a checksum hash of the original record is calculated and saved for later. At 910, the child record is verified using functionality of FIG. 4 or 5. The child record will be invalid if a signature verification fails, or if transaction rules were violated. At 912, if the child record is invalid, and the recording fails. Otherwise, at 914 a checksum hash of the new child record is calculated and saved for later. A checksum of the old original record was already saved, but a checksum of the new record is also needed.

At 916, if there are more child records in the batch, the functionality continues at 904. Otherwise, at 918, all child records in the batch should be unique continuations of the same original record. Embodiments need to make sure that all child records have the same exact origin, or, in other words, the original record portion is identical in all of them. There are multiple ways of doing this. One is to compare their text, without the last transaction, to make sure they all have the same identical original portion. Another way, is used in the embodiment of FIG. 9, is to take all checksums that were produced in step 3, and make sure they all match. For each child record, we made a checksum of their original record at 908. If all of them produced the same checksum, then they all have the same exact original record as a starting point, and the process can continue. If at least one child record has a mismatching "original record" in it, then the process must fail.

At 920, the checksum that was produced at 908, which is now known is the same for all child records, is determined whether it exist in the repository as a valid record. If no at 920, the process fails. The original record is not valid if it does not have a checksum in the repository. If yes at 920, at 922 the checksum of the original record from the repository is removed. At 924, the checksums of each child record is inserted into the repository.

908, 910, 912 and 914 can be in different order. For example, the checksum can be determined after verifying the file. 918 and 920 can be in any order. 922 and 924 should be atomic, in "all or nothing fashion". All inserts and delete have to succeed, otherwise all have to rollback to initial state.

In embodiments, all child records must be unique. For example, if Alice assigns 2 units to Bob, and 2 more units to Bob and 2 more units to Bob, the 3 subtrahends would result in 3 identical records, with the same checksum. The should be taken into account to ensure that each child record has sufficient information, such as a unique part ID number for each transaction, in order to ensure that all child records are unique by at least one character, so that they yield a unique checksum in the repository.

Further, in embodiments, an option for split transactions to be recorded one by one can be included so that the original document keeps a tally of transactions. For example, if Alice gives a portion of a quantity to Bob, and then another portion to Carol, and then another portion to Dave, Alice could have the leftovers in a record that contains trace of all 3 different split transactions, as a tally. This is useful if Alice needs to prove to Bob that she made a payment to his address. The proof would be that her currently valid file shows a transaction of payment to Bob's address. This makes the record a running ledger of payment history in itself.

As example, a record may be split into a batch of 3 child records. In this example, a creator (5XA5A . . . ) creates a record with a supply of 10 "Kudos", and assigns it to Alice (CIDK3 . . . ). Alice then splits the 10 Kudos assigning 3 Kudos to Bob (SDJF8 . . . ), 2 Kudos to Carol (S98DF . . . ), and the remaining 5 Kudos she assigns back to herself. The batch of 3 child records is represented in JSON format as an array of 3 nested JSON documents as follows:

```
[
  {
    "Title": "Appreciation Kudos",
    "parameters": [
      {
        "name": "Kudos",
        "type": "number",
        "value": 10,
        "dividible": true
      }
    ],
    "creator_address": "5XA5AH7B0N5FEMGX72KFLRLMOGFWIFSUWMOOSXUO7FUL2SSA7HXU5Q3",
    "transactions": [
      {
        "id": 1,
        "type": "transfer",
        "from": "5XA5AH7BON5FEMGX72KFLRLMOGFWIFSUWMOOSXU07FUL2SSA7HXU5Q3",
        "to": "CIDK3FPH9SIGJWMEAGXSMBEPCOLFCZSIA1P25DRJSNPFWHAFEAK8NSIU",
        "public_key": "38FBF6P8VT33IV8TDT6APUD1G4UHVTRUN6OYAJPQA4QUTFX7Q6QH49ZDF53FRAUHOR137MY1QSKIVRWYHTLSSQ2NZR9B81TON9QLPCZLQXG363GB0WSXMOS1ZMO5",
        "signature": "7O6PRLXXB4ZFPPHK9X258SMV4OY2UKQVDR87ZNL9F7PNH06L0O5EZ8WHTZ6UVGZZ1IDPPJ97JV1HGK31MIPJQK7RZU0IQY3T0CV"
      },
      {
        "id": 2,
        "type": "split",
        "source": "Kudos",
        "quantity": 3,
        "from": "CIDK3FPH9SIGJWMEAGXSMBEPCOLFCZSIA1P25DRJSNPFWHAFEAK8NSIU",
        "to": "SDJF8723I4SMNKSDF912KHJKSDFSDF987DKK2KJ34MSDFHISUDF97234",
        "public_key": "SDF9078ADSFHL34HL5KJ2H98D76SIH435908D7FGJH32459087DSFGLKHJ324598DS7FGLH3245987DSFG79854032LJSDFG987SDFGLK3J2LJDGFDK2JH34K2J3",
        "signature": "KDIJD8D8EYUDNNBZZ76DS234987SDFDD8SJ74SJKHDDFJKSDHF89SDFKJWHERLKJSDLKSLASDMBNXCMNBQIWU987219080USDF0"
      }
    ]
  },
  {
    "Title": "Appreciation Kudos",
    "parameters": [
      {
        "name": "Kudos",
        "type": "number",
```

```
            "value": 10,
            "dividible": true
          }
      ],
      "creator_address": "5XA5AH7B0N5FEMGX72KFLRLMOGFWIFSUWMOOSXUO7FUL2SSA7HXU5Q3",
      "transactions": [
          {
            "id": 1,
            "type": "transfer",
            "from": "5XA5AH7B0N5FEMGX72KFLRLMOGFWIFSUWMOOSXUO7FUL2SSA7HXU5Q3",
            "to": "CIDK3FPH9SIGJWMEAGXSMBEPCOLFCZSIA1P25DRJSNPFWHAFEAK8NSIU",
            "public_key":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B81TON9QLPCZLQXG363GB0WSXMOS1ZMO5",
            "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
          },
          {
            "id": 2,
            "type": "split",
            "source": "Kudos",
            "quantity": 2,
            "from": "CIDK3FPH9SIGJWMEAGXSMBEPCOLFCZSIA1P25DRJSNPFWHAFEAK8NSIU",
            "to": "S98DF7SDFKLJLRKJLSDF098SDFLKJ3LKJSDF09SD8FLK2J3RSD09F8FD",
            "public_key":
"SDF9078ADSFHL34HL5KJ2H98D76SIH435908D7FGJH32459087DSFGLKHJ324598DS7FGLH3245987
DSFG79854032LJSDFG987SDFGLK3J2LJDGFDK2JH34K2J3",
            "signature":
"KJHASDF89A7DSFLJH2309SA7DFOAIHJLJAF9A8UL3J4AD90F8A7UFLADSFLKJADFHA90876FAOIUH
21U32O987AOIUFHAG0A9A8"
          }
      ]
    },
  ,
    {
      "Title": "Appreciation Kudos",
      "parameters": [
          {
            "name": "Kudos",
            "type": "number",
            "value": 10,
            "dividible": true
          }
      ],
      "creator_address":
"5XA5AH7B0N5FEMGX72KFLRLMOGFWIFSUWMOOSXUO7FUL2SSA7HXU5Q3",
      "transactions": [
          {
            "id": 1,
            "type": "transfer",
            "from": "5XA5AH7B0N5FEMGX72KFLRLMOGFWIFSUWMOOSXUO7FUL2SSA7HXU5Q3",
            "to": "CIDK3FPH9SIGJWMEAGXSMBEPCOLFCZSIA1P25DRJSNPFWHAFEAK8NSIU",
            "public_key":
"38FBF6P8VT33IV8TDT6APUD1G4UHVTRUN6OYAJPQA4QUTFX7Q6QH49ZDF53FRAUHOR137MY1Q
SKIVRWYHTLSSQ2NZR9B81TON9QLPCZLQXG363GB0WSXMOS1ZMO5",
            "signature":
"7O6PRLXXB4ZFPPHK9X258SMV4OY2UKQVDR87ZNL9F7PNH06L0O5EZ8WHTZ6UVGZZ1IDPPJ97JV
1HGK31MIPJQK7RZU0IQY3T0CV"
          },
          {
            "id": 2,
            "type": "split",
            "source": "Kudos",
            "quantity": 5,
            "from": "CIDK3FPH9SIGJWMEAGXSMBEPCOLFCZSIA1P25DRJSNPFWHAFEAK8NSIU",
            "to": "CIDK3FPH9SIGJWMEAGXSMBEPCOLFCZSIA1P25DRJSNPFWHAFEAK8NSIU",
            "public_key":
"SDF9078ADSFHL34HL5KJ2H98D76SIH435908D7FGJH32459087DSFGLKHJ324598DS7FGLH3245987
DSFG79854032LJSDFG987SDFGLK3J2LJDGFDK2JH34K2J3",
            "signature":
"KJLHADF09A8DSFLKJHQ39087ADOFHJASDF987A6SDFILKJQH3IAS90D8F7AOSIDFHJAKHJGFS8I76
DSAUYGDHKSAJDHFGASDF7A"
          }
      ]
    }
]
```

As disclosed, embodiments create a ledger database made up of standalone files. For example, Alice's bank account is a file on her personal laptop. Bob's bank account is a file on his smartphone. They are the custodians of their own ledger history, yet, modern encryption make it unfeasible for them to cheat. This model makes storage virtually limitless, because the bulk of the data is offloaded to consumer's own devices. The controlling database in embodiments does not need to store everything, but only a small checksum of each standalone file. Therefore, a few bytes of database storage can represent, and validate, gigabytes of application data offloaded to consumers own devices.

Embodiments enable the following example use cases:
1. Tickets to a concert, or sport event, or ferry, etc. Ticket owners can be admitted by presenting a "signed" QR code image to a scanner. Tickets cannot be used twice. Tickets cannot be counterfeited. Ticket theft is useless without a private key.
2. Tickets for food, beverages and activities at a public fair, as a digital replacement for paper chain tickets (e.g., the red coupons that say "admit one"). Prevents loss from people bringing non-legitimate tickets. Eliminates need to exchange cash, as people can load ticket credit into their phone app using credit card, PayPal, etc.
3. Raffle tickets. Same as above. People buy raffle tickets, they get digital certificates that are impossible to counterfeit, and only the true owner can redeem it.
4. Guest credit at a casino, resort, or cruise ship. Instead of funding credit into a plastic card, guests could fund credit into their phones.
5. Supply chain integrity. A pharmaceutical company can ship medication to a retailer or hospital, and certify that it is authentic by using a certificate that shows the signature chain of all planned transfers (e.g., trucks, warehouses, etc.). After being sold/consumed, that certificate can no longer be used to represent another bottle with a copied serial number.
6. Video game consumables, such as ownership of a game map, or a famous athlete's card in a sports video game.
7. Digital Securities exchange: A Decentralized Autonomous Company issues their shares in the form of Distributed Data Records. Votes and transfers are made by those who can sign with a private key. Digital property such as data in a database, or token supply, control of an online organization, or open source projects are examples of divisible property that are not regulated by the US Securities Exchange Committee.
8. Certificate of authenticity and title of ownership issued with collectibles or memorabilia.
9. Voting systems. Each voter receives a unique certificate as a digital ballot, and sends a signed final vote to vote counters. Vote from home.
10. Any contract document that should be signed by a key holder rather than a person.

Embodiments have the following advantages over storing data in a traditional database or blockchain:
1. Complete privacy. There is no database instance or node that could be forensically investigated to analyze the current state of records, or transaction history, because that information is kept in detached, independent record files throughout the world, probably stored in users' personal devices, not in a database instance. One cannot run a report query against the dataset, and this limitation is a desirable feature in some privacy-oriented use cases.
2. Portability. A community may improvise a system of records on the spot, without needing to develop or fund a backend database solution. They would only need their smartphones or computers in order to issue records and perform transactions with them. Building transactional systems without the cost of a database enables free open-source efforts. For example, a community could develop an open-source videogame, and players would be able to exchange in-game consumables without having to develop or fund a backend system for trading items.
3. Scalability. Since information is not stored in database nodes, storage allocation is not a challenge.
4. Availability. In the traditional database model, transactions cannot occur when a database is unavailable or unreachable. In contrast, in embodiments, transactions occur on users' own devices, and the resulting updated record (with new transaction history and state) may be sent directly to another user.
5. Verifiability. With embodiments, when someone claims to have control of a record and lists the record for sale or for use, either privately or publicly, others can quickly verify the record's integrity and legitimacy. For example, if someone posts on a website that they are selling a record, such as a ticket, or a videogame consumable, or a title, potential buyers will be able to verify if the record listed for sale is authentic and that the seller indeed controls it, or in other words, it is not a fake. Record owners can safely allow public inspection of a record and still maintain full control of the record because transactions must be digitally signed by a secret private key. Exposing a record publicly does not put it at risk of being stolen. This is a big advantage, because many times people list digital items for sale on the internet (such as videogame consumables, or event tickets) they are fake or scam.
6. Guaranteed value. A user (or technically the user's key pair and address) cannot be banned from the system, because there is no instance keeping track of such entities. Moreover, a record cannot be altered by an administrator to increase or diminish its value because there is no such instance that would be exposed or subject to the powers of an administrator. These limitations may be a desirable protection in some use cases that require ultimate trust. Optionally, it is also easy to guarantee a finite supply of records so that all participants (service providers and consumers) can be certain that a finite supply limit will be enforced (or in other words, there will never be new additional supply items issued). This guarantee is possible and optional, and could be useful to prevent corruption, or injection of counterfeit products into a supply chain. Value is guaranteed as long as users do not lose records or the private keys that control their records.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:
1. A computer implemented method, using at least one or more hardware processors, of verifying a digital asset by a first owner of the digital asset in response to a first transaction with a creator of the digital asset, the first owner having a corresponding first owner private key and a first owner public key, the method comprising:

receiving a first digital record that corresponds to the digital asset, the first digital record comprising:
an initial portion comprising one or more initial parameters and a creator public key of the creator, and an appended initial digital signature computed using the one or more initial parameters, the creator public key, and a creator private key of the creator;
a first portion comprising one or more first parameters wherein a first parameter comprises the first transaction assigning ownership of the digital asset from the creator to the first owner and includes a first field that specifies the first owner public key and the creator public key, and an appended first digital signature computed using the initial portion, the initial digital signature, the first portion and the creator private key;
extracting from the first digital record the creator public key;
extracting from the first digital record the first digital signature;
extracting from the first digital record the initial portion, the initial digital signature, and the first portion; and
using a verification function, and the extracted creator public key, the first digital signature and the initial portion, confirming that the first digital signature was computed using the creator private key.

2. The method of claim 1, wherein the first digital signature comprises a signature hash value.

3. The method of claim 1, further comprising executing a second transaction for the digital asset with a second owner having a second owner private key and a second owner public key, the executing comprising:
adding to the first digital record a second portion comprising a second parameter comprising the second transaction assigning ownership of the digital asset from the first owner to the second owner and including a second field that specifies the second owner public key;
computing a second digital signature using the first owner private key, the first digital record and the second portion;
creating a second digital record by appending the second digital signature on the first digital record and the second portion; and
sending the second digital record to the second owner, wherein the second digital record represents the digital asset.

4. The method of claim 1, wherein the first digital record comprises multiple transactions, each transaction including a new digital signature computed using a current owner private key, further comprising using the verification function to confirm the new digital signature of each transaction.

5. The method of claim 1, wherein the first field comprises a first hash value derived from the first owner public key.

6. The method of claim 1, where at least one of the parameters is required by a rule.

7. The method of claim 6, wherein one of the parameters is a counter that is incremented each time the digital asset changes ownership.

8. The method of claim 1, wherein a stored checksum hash of the initial portion and the initial digital signature was stored by a third party validator, the validating further comprising computing a new checksum hash of the initial portion and the initial digital signature and comparing the new checksum hash with the stored checksum hash.

9. A non-transitory computer-readable medium having instructions stored thereon, when executed by a processor, cause the processor to verify a digital asset by a first owner of the digital asset in response to a first transaction with a creator of the digital asset, the first owner having a corresponding first owner private key and a first owner public key, the verifying comprising:
receiving a first digital record that corresponds to the digital asset, the first digital record comprising:
an initial portion comprising one or more initial parameters and a creator public key of the creator, and an appended initial digital signature computed using the one or more initial parameters, the creator public key, and a creator private key of the creator;
a first portion comprising one or more first parameters wherein a first parameter comprises the first transaction assigning ownership of the digital asset from the creator to the first owner and includes a first field that specifies the first owner public key and the creator public key, and an appended first digital signature computed using the initial portion, the initial digital signature, the first portion and the creator private key;
extracting from the first digital record the creator public key;
extracting from the first digital record the first digital signature;
extracting from the first digital record the initial portion, the initial digital signature, and the first portion; and
using a verification function, and the extracted creator public key, the first digital signature and the initial portion, confirming that the first digital signature was computed using the creator private key.

10. The non-transitory computer-readable medium of claim 9, wherein the first digital signature comprises a signature hash value.

11. The non-transitory computer-readable medium of claim 9, further comprising executing a second transaction for the digital asset with a second owner having a second owner private key and a second owner public key, the executing comprising:
adding to the first digital record a second portion comprising a second parameter comprising the second transaction assigning ownership of the digital asset from the first owner to the second owner and including a second field that specifies the second owner public key;
computing a second digital signature using the first owner private key, the first digital record and the second portion;
creating a second digital record by appending the second digital signature on the first digital record and the second portion; and
sending the second digital record to the second owner, wherein the second digital record represents the digital asset.

12. The non-transitory computer-readable medium of claim 9, wherein the first digital record comprises multiple transactions, each transaction including a new digital signature computed using a current owner private key, further comprising using the verification function to confirm the new digital signature of each transaction.

13. The non-transitory computer-readable medium of claim 9, wherein the first field comprises a first hash value derived from the first owner public key.

14. The A computer implemented method, using at least one or more hardware processors, of verifying a digital asset by a first owner of the digital asset in computer-readable medium of claim 9, where at least one of the parameters is required by a rule.

15. The non-transitory computer-readable medium of claim 14, wherein one of the parameters is a counter that is incremented each time the digital asset changes ownership.

16. The non-transitory computer-readable medium of claim 9, wherein a stored checksum hash of the initial portion and the initial digital signature was stored by a third party validator, the validating further comprising computing a new checksum hash of the initial portion and the initial digital signature and comparing the new checksum hash with the stored checksum hash.

17. A digital asset transaction verification system comprising:
 one or more hardware processors that execute stored instructions to verifies a digital asset for first owner of the digital asset in response to a first transaction with a creator of the digital asset, the first owner having a corresponding first owner private key and a first owner public key, the verifying comprising:
 receiving a first digital record that corresponds to the digital asset, the first digital record comprising:
  an initial portion comprising one or more initial parameters and a creator public key of the creator, and an appended initial digital signature computed using the one or more initial parameters, the creator public key, and a creator private key of the creator;
  a first portion comprising one or more first parameters wherein a first parameter comprises the first transaction assigning ownership of the digital asset from the creator to the first owner and includes a first field that specifies the first owner public key and the creator public key, and an appended first digital signature computed using the initial portion, the initial digital signature, the first portion and the creator private key;
  extracting from the first digital record the creator public key;
  extracting from the first digital record the first digital signature;
  extracting from the first digital record the initial portion, the initial digital signature, and the first portion; and
  using a verification function, and the extracted creator public key, the first digital signature and the initial portion, confirming that the first digital signature was computed using the creator private key.

18. The system of claim 17, wherein the first digital signature comprises a signature hash value.

19. The system of claim 17, further comprising executing a second transaction for the digital asset with a second owner having a second owner private key and a second owner public key, the executing comprising:
 adding to the first digital record a second portion comprising a second parameter comprising the second transaction assigning ownership of the digital asset from the first owner to the second owner and including a second field that specifies the second owner public key;
 computing a second digital signature using the first owner private key, the first digital record and the second portion;
 creating a second digital record by appending the second digital signature on the first digital record and the second portion; and
 sending the second digital record to the second owner, wherein the second digital record represents the digital asset.

20. The system of claim 17, wherein the first digital record comprises multiple transactions, each transaction including a new digital signature computed using a current owner private key, further comprising using the verification function to confirm the new digital signature of each transaction.

\* \* \* \* \*

UNITED STATES PATENT AND TRADEMARK OFFICE
CERTIFICATE OF CORRECTION

PATENT NO. : 10,771,257 B1  
APPLICATION NO. : 16/530224  
DATED : September 8, 2020  
INVENTOR(S) : de Matos Page 1 of 1

It is certified that error appears in the above-identified patent and that said Letters Patent is hereby corrected as shown below:

In the Specification

In Column 6, Line 55, delete "ZU01Q" and insert -- ZU0IQ --, therefor.

In the Claims

In Columns 28-29, Lines 66-67 (Column 28) 1-2 (Column 29), in Claim 14, delete "A computer implemented method, using at least one or more hardware processors, of verifying a digital asset by a first owner of the digital asset in computer-readable medium" and insert -- non-transitory computer-readable medium --, therefor.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*